United States Patent
Valbjørn et al.

[11] Patent Number: 5,647,394
[45] Date of Patent: Jul. 15, 1997

[54] CONTROL VALVE

[75] Inventors: Anders Valbjørn, Nordborg; Erik Plauborg, Sønderborg, both of Denmark; Siegfried Zenker, Kirchseeon, Germany

[73] Assignee: Danfoss A/S, Nordborg, Denmark

[21] Appl. No.: 656,190

[22] PCT Filed: Dec. 1, 1994

[86] PCT No.: PCT/DK94/00449
§ 371 Date: Jul. 29, 1996
§ 102(e) Date: Jul. 29, 1996

[87] PCT Pub. No.: WO95/16158
PCT Pub. Date: Jun. 15, 1995

[30] Foreign Application Priority Data

Dec. 8, 1993 [DE] Germany .................. 43 41 848.1

[51] Int. Cl.[6] ................................................ F16K 31/12
[52] U.S. Cl. ............................ 137/501; 137/614.19
[58] Field of Search ............................ 137/501, 517, 137/494, 497, 500, 512, 512.5, 613, 614.19, 614; 251/50

[56] References Cited

U.S. PATENT DOCUMENTS

| 2,309,773 | 2/1943 | Kaufman | 137/501 |
| 2,623,331 | 12/1952 | Greening | 137/501 |
| 3,428,080 | 2/1969 | Brown | 137/501 |
| 3,534,769 | 10/1970 | Leveque | 137/501 |
| 3,677,288 | 7/1972 | Martin | 137/501 |
| 4,449,548 | 5/1984 | Tutherly | 137/501 |
| 5,190,075 | 3/1993 | Tentler | 137/501 |

Primary Examiner—Denise L. Ferensic
Assistant Examiner—Ramyar M. Farid
Attorney, Agent, or Firm—Lee, Mann, Smith, McWilliams, Sweeney & Ohlson

[57] ABSTRACT

A control valve is disclosed, having a housing which has an input port and an output port that are connected to one another by a flow path in which a throttling device is arranged. It is desirable for such a control valve to be able to hold a volume flow constant, irrespective of the load pressure at the output port. For that purpose, the throttling device comprises a series connection of a first throttle, the passage of which is externally adjustable, and a second throttle, the passage of which is adjustable in dependence on pressure.

6 Claims, 1 Drawing Sheet

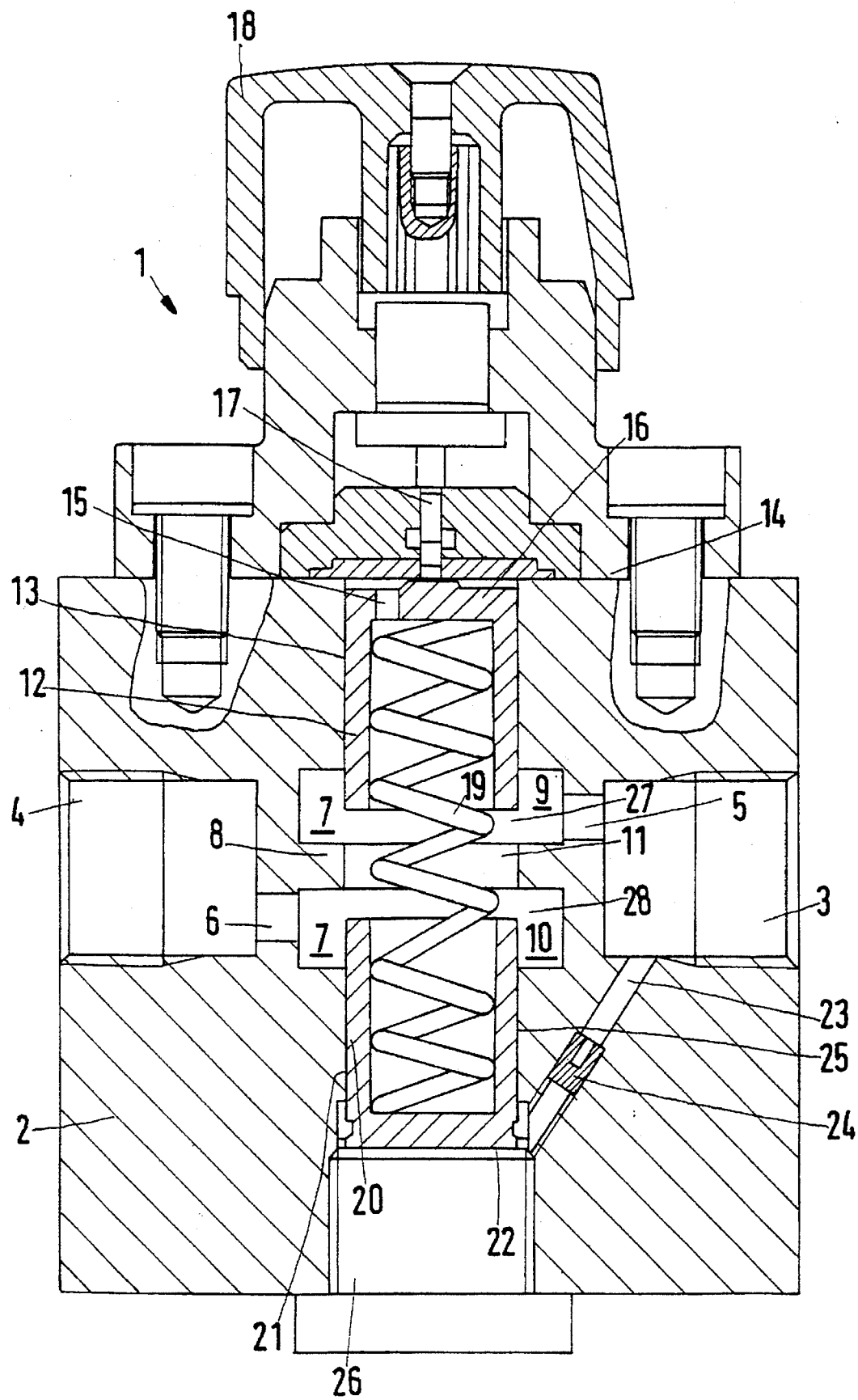

CONTROL VALVE

The invention relates to a control valve having a housing which has an input port and an output port that are connected to one another by a flow path in which a throttling device is arranged.

U.S. Pat. No. 4,858,222 discloses a control valve which is arranged between a directional valve and a hydraulic motor. Both the inlet line and the discharge line of the motor pass through the control valve. Using two movable sliders and a common counterpressure spring, the attached motor is controlled so that its speed is kept constant irrespective of the loading of the motor.

Furthermore, U.S. Pat. No. 4,422,470 discloses a compensating valve provided between a pump and a control valve. The compensating valve is controlled by a spring and a measurement signal which originates from the pressure at a point between the control valve and a work apparatus connected thereto.

The present invention is intended to provide a control valve which is able to hold a volume flow constant irrespective of the load pressure for a connected load.

In the case of a control valve of the kind mentioned in the introduction, this problem is solved in that the throttling device comprises a series connection of a first throttle, the passage of which is externally adjustable, and a second throttle, the passage of which is adjustable in dependence on pressure.

An area of application for such a control valve comprises, for example, controlling the speed of a hydraulic motor which it is desirable to keep constant irrespective of the loading of the motor.

The speed is now determined using the externally, in particular, manually, controllable first throttle. The second throttle, the passage of which, that is to say, the flow cross-section of which, is adjustable in dependence on pressure, responds to pressure changes at the output port that correspond to the loading of the connected load, so that when the pressure at the output port is relatively large, the second throttle opens wider. With an unchanged volume flow, the pressure drop across the second throttle consequently decreases, and the load can be operated at the correspondingly higher pressure. Conversely, if the pressure at the output port drops, the passage or the flow cross-section of the second throttle is reduced, so that with an otherwise unchanged volume flow a larger pressure drop is effected. The load accordingly also receives only a relatively low pressure. Because adjustment of the passage is effected in dependence on pressure, a control loop which operates without further external control elements or signals can be built up here.

It is here preferable for the second throttle to comprise an adjusting element which is urged in the opening direction by an opening pressure dependent on the output pressure and by a spring, and is urged in the closing direction by a closing pressure dependent on the input pressure. When the output pressure prevailing in the output port rises because of a higher loading of the load, a correspondingly larger opening pressure acts in the opening direction on the adjusting element, so that the passage of the second throttle is enlarged. The volume flow can remain the same since the pressure drop it produces at the second throttle is smaller. Conversely, the adjusting element is moved in the closing direction when the output pressure in the output port drops.

The adjusting element is preferably arranged in the housing with a freedom of movement which allows a throttled through-flow of hydraulic fluid from the input port past the adjusting element to the output port. This through-flow forms a film of fluid between the adjusting element and the housing, which enables very low-friction movement of the adjusting element in the housing. Adjustment of the position of the adjusting element is therefore effected exclusively as a function of pressure, because in practice no frictional forces have to be overcome. The gap between the adjusting element and the housing forms, as it were, an auxiliary throttle, at which the normal pressure drop between input port and output port occurs.

The adjusting element preferably forms a wall of a pressure chamber, which is connected to the input port by way of a duct in which a third throttle is arranged. The adjusting element is therefore loaded in the closing direction no longer directly by the pressure at the input port, the input pressure, but by the pressure at the centre tap of a pressure divider formed by the third throttle and the auxiliary throttle. The control characteristic of the valve can be further improved by this measure.

The third throttle is preferably formed by an exchangeable or adjustable flow nozzle element. The third throttle can then be adapted to the circumstances, for example, different sizes of load.

It is also preferred for the adjusting element to pass through a section in the housing which get shorter as the passage of the second throttle reduces. In other words, the pressure at the centre tap of the pressure divider drops further, the more the second throttle is closed. When the second throttle is almost closed, the flow speed of the through-flowing fluid rises, and the active opening pressure of the second throttle is reduced. It is then an advantage if the closing pressure too is reduced at the same time. This construction produces a very stable control behaviour.

The adjusting element is preferably formed by a piston, the lateral face of which co-operates with a substantially hollow cylindrical valve seat. This construction is relatively unaffected by wear. Wear that may occur in particular when hydraulic fluids of relatively low boiling point, such as water, are used, can then be compensated for by inserting the piston further into the hollow-cylindrical valve seat. This again compensates for the closing action of the throttles which has become impaired by the wear.

It is also preferable for the first throttle to comprise a throttling element which is likewise in the form of a piston, the lateral face of which co-operates with the same valve seat. Here, adjusting element and throttling element are moved towards the valve seat from opposing directions. There is no difference in function between the throttling element and the adjusting element in respect of the throttling effect. The different terms have merely been chosen for the purposes of distinguishing one from the other. When both throttles are at least partially open, the fluid passes through the hollow-cylindrical valve seat. The construction of the valve arrangement can be made at least partially symmetrical, which facilitates manufacture.

The valve seat is preferably arranged in a separating wall which divides a chamber into which the throttling element and/or the adjusting element can be moved from opposing sides. The construction of the chamber, and in particular the separating wall, therefore defines the flow characteristic of the hydraulic fluid in the region of the throttles. It is therefore possible to let the two throttles follow directly one after the other, which decreases the tendency for the pressure to fluctuate in the hydraulic fluid. In addition, additional leads or ducts are unnecessary, which further facilitates manufacture.

It is here preferred for the chamber to be connected by way of a first fixed throttle to the input port and/or by way of a second fixed throttle to the output port. The two fixed throttles, of which either both or just one can be provided, can be used to determine the control behaviour of the valve more specifically.

The spring is preferably in the form of a compression spring and is arranged between the adjusting element and the throttling element. Only one spring is therefore needed for both throttles. This simplifies construction. In addition, the spring-derived restoring forces for the throttling element and the adjusting element are identical, so that no additional measures are required to match them to one another. Moreover, whenever the throttling element is adjusted, a matching change in the bias for the adjusting element is effected at the same time.

Advantageously, the adjusting element and/or the throttling element are in the form of a hollow piston, in which the spring is inserted. The spring is guided by means of the adjusting element and/or the throttling element. Further measures for holding the spring are unnecessary.

The throttling element is preferably loaded on both sides by the same fluid pressure which acts on substantially equal areas. In this manner the forces exerted on the throttling element by the fluid pressure are substantially cancelled out. The forces required for manual adjustment only have to counteract the spring force.

It is also preferred for the position of the throttling element to be alterable by an externally operated setting element, against which the throttling element lies under the influence of the spring. The position of the throttling element is consequently clearly related to the particular position of the setting element, without the possibility of directional dependency in adjusting the position of the throttling element. Adjustment of the control behaviour is simplified by that measure.

The invention is described in the following with reference to a preferred embodiment and in conjunction with the drawing, in which the single figure shows a diagrammatic cross-section through a control valve.

A control valve 1 has a housing 2 with an input port 3 and an output port 4.

The pressure in the input port 3 is an input pressure which is produced, for example, by a pressure source, not illustrated, such as a pump. The pressure in the output port 4 is an output pressure which corresponds to the input pressure of a load, also not illustrated. This input pressure is generally dependent on the loading of the load.

The input port 3 is connected by way of a first fixed throttle 5 and the output port 4 is connected by way of a second fixed throttle 6 to a chamber 7. The chamber 7 is divided by a separating wall 8 into a first half 9, which is connected to the input port 3, and a second half 10, which is connected to the output port 4. The separating wall 8 has a hollow-cylindrical bore 11, which forms the connection between the first and the second half of the chamber 7.

A throttling element 12 in the form of a hollow cylinder which passes through a bore 13 in the housing 2 projects into the first half 9 of the chamber 7. On the side facing away from the chamber 7, the throttling element 12 bounds a pressure chamber 14 which is acted upon through an opening 15 in the end wall 16 with the same fluid pressure as the first half 9 of the chamber 7. Because the faces of the throttling element 12 on which pressure acts are substantially the same size, these faces being oppositely arranged in the direction of movement, a pressure equilibrium is produced by way of the throttling element 12.

The end face of the throttling element 12 facing the pressure chamber 14 lies adjacent to a setting element 17, which can be adjusted axially by way of a knob 18, that is, in the direction of movement of the throttling element 12, in order to change or fix the position of the throttling element 12 in the housing 2.

The throttling element 12 is acted upon on the side facing away from the pressure chamber 14 by a compression spring 19 which is introduced into the inside of the hollow-cylindrical throttling element 12. The throttling element 12 therefore guides this compression spring 18.

The other end of the compression spring 19 bears against the inside of the adjusting element 20, which is likewise in the form of a hollow piston. The compression spring 19 is here guided through the bore 11 in the separating wall 8.

The adjusting element 20 is mounted so as to be axially displaceable in a bore 21 in the housing 2. on the side facing away from the compression spring 19 the adjusting element is acted upon by the pressure in a pressure chamber 22, which is connected by way of a duct 23 to the input port 3. In the duct 23 there is an exchangeable or adjustable flow nozzle element. There is a gap 25 in the bore 21 between the adjusting element 20 and the housing 2. The adjusting element 20 is thus mounted in the housing 2 with freedom of movement. The hydraulic fluid from the pressure chamber 22 is able to pass through the gap 25 past the adjusting element 20 into the second half 10 of the chamber 7. The pressure chamber 22 is closed by a stopper 26.

Together with the bore 11 in the separating wall 8, the throttling element 12 forms a first throttle 27. Together with the separating wall 8, the adjusting element 20 forms a second throttle 28. The wall of the bore 11 here acts as a valve seat which co-operates with the outer wall of the throttling element 12 and adjusting element 20. Throttling element 12 and adjusting element 20 can be introduced into the bore 11 from opposite ends. The first throttle 27 is adjustable by means of the knob 18. Since the throttling element 12 is held by the action of the compression spring 19 permanently in engagement with the setting element 17, the position of the throttling element 12 in the housing 2, and thus the magnitude, i.e. the passage cross-section, of the first throttle 27, can be clearly determined by turning the knob 18.

The second throttle 28 is adjustable in dependence on pressure. The flow nozzle element 24 forms a third fixed throttle. The gap 25 forms an auxiliary throttle, the passage of which is dependent on the position of the adjusting element 20 in the housing. The further the adjusting element 20 is pushed into the second half 10 of the chamber 7, the smaller is the throttle resistance of the auxiliary throttle formed by the gap 25. The pressure chamber 22 is therefore determined by the pressure at the centre tap of the pressure divider formed by the third throttle and the auxiliary throttle. The pressure in the pressure chamber 22 is a closing pressure, which acts in a direction to reduce the passage of the second throttle 28. On the other hand, the pressure in the second half 10 of the chamber 7 which, disregarding the pressure drop of the second fixed throttle 6, corresponds to the pressure in the output port 4, is an opening pressure which attempts to enlarge the passage of the second throttle 28. When the second throttle 28 is almost closed, the flow speed of the through-flowing fluid increases and the active opening pressure of the second throttle 28 decreases. Advantageously, however, the closing pressure is also reduced at the same time.

If the pressure at the output port 4 is low, the second throttle 28 also has only a small opening because the pressure in the pressure chamber 22 displaces the adjusting 20 towards the separating wall 8. Accordingly, with a preset flow rate there is a correspondingly larger pressure drop across the second throttle 28. If, however, the pressure at the output port 4 is greater, the throttle 28 is opened wider so that with the flow rate remaining the same the pressure drop across the second throttle 28 becomes smaller. Because hydraulic fluid is continuously passing through the gap 25, a film of fluid is generated there which leads to practically friction-free sliding of the adjusting element 20 in the housing 2.

The nozzle 24 provides not only a pressure divider but also acts as a damping element, which damps possible oscillation of the adjusting element 20. Since the length of the gap 25 is dependent on the position of the adjusting element 20 in the bore 21, the pressure in the pressure chamber 22 is lower, the further the adjusting element 20 has been advanced from the bore. The force which attempts to press the adjusting element 20 back into the bore again is correspondingly larger. A relatively stable control behaviour is therefore achieved. The correspondingly larger restoring force additionally counteracts the flow forces that occur with relatively large flows, so that a further improvement can be achieved here in configuring the independence of the flow rate from the pressures.

What is claimed is:

1. A control valve having a housing which has an input port and an output port that are connected to one another by a flow path in which a throttling device is arranged, the throttling device comprising a series connection of a first throttle having a passage externally adjustable, and a second throttle having a passage which is adjustable in dependence on fluid pressure;

the first throttle comprises a throttling element which is in the form of a piston having a lateral face which co-operates with a valve seat;

the position of the throttling element is alterable by an externally operated setting element, against which the throttling element lies under the influence of a spring;

the second throttle comprises an adjusting element which is urged in an opening direction by an opening pressure dependent on output pressure and by the spring, and which is urged in a closing direction by a closing pressure dependent on input pressure;

the spring is arranged between the adjusting element and the throttling element;

the valve seat is located in a separating wall which divides a chamber, the throttling element and the adjusting element being movable into the chamber from opposing sides;

the chamber is connected by way of a first fixed throttle to the input port and is connected by way of a second fixed throttle to the output port;

the adjusting element is arranged in the housing with a freedom of movement which allows a throttled through-flow of hydraulic fluid from the input port past the adjusting element to the output port;

the adjusting element comprises a piston having a lateral face which co-operates with a substantially hollow cylindrical valve seat;

the adjusting element passes through a section in the housing that forms an auxiliary throttle, the section diminishes as the passage of the second throttle increases for providing a decrease in throttle resistance of the auxiliary throttle; and the adjusting element further forms a wall of a pressure chamber which is connected to the input port by way of a duct in which a third throttle means is arranged for providing damping to oscillation of adjusting element; whereby the third throttle means and the auxiliary throttle form a pressure divider.

2. A control valve according to claim 1, in which the third throttle is formed by an adjustable flow nozzle element.

3. A control valve according to claim 1, in which the third throttle is formed by an exchangeable flow nozzle element.

4. A control valve according to claim 1, in which the spring is in the form of a compression spring.

5. A control valve according to claim 4, in which at least one of the adjusting element and the throttling element is in the form of a hollow piston, in which the spring is inserted.

6. A control valve according to claim 1, in which the throttling element is loaded on both sides by fluid pressure which acts on substantially equal areas.

* * * * *